United States Patent [19]

Numata et al.

[11] 4,112,446
[45] Sep. 5, 1978

[54] EXPOSURE CONTROL CIRCUIT FOR CAMERAS WITH SHUTTER RELEASE LOCKING MEANS

[75] Inventors: Saburo Numata; Shinichiro Okazaki, both of Urawa, Japan

[73] Assignee: Fuji Photo Optical Co., Ltd., Omiya-shi, Japan

[21] Appl. No.: 816,187

[22] Filed: Jul. 15, 1977

[30] Foreign Application Priority Data

Jul. 17, 1976 [JP] Japan .................................. 51-85400

[51] Int. Cl.² ........................ G03B 7/08; G03B 17/38
[52] U.S. Cl. ....................................... 354/50; 354/268
[58] Field of Search ...................... 354/24, 29, 30, 36, 354/38, 50, 51, 60 R, 258, 266, 267, 268; 356/223; 352/69, 74, 76, 78

[56] References Cited

U.S. PATENT DOCUMENTS

| | | | |
|---|---|---|---|
| 3,824,611 | 7/1974 | Land et al. | 354/266 X |
| 3,863,263 | 1/1975 | Itagaki | 354/50 X |
| 3,973,267 | 8/1976 | Hashimoto et al. | 354/29 X |
| 4,034,390 | 7/1977 | Urano et al. | 354/268 X |
| 4,070,682 | 1/1978 | Numata et al. | 354/51 |

*Primary Examiner*—L. T. Hix
*Assistant Examiner*—William B. Perkey
*Attorney, Agent, or Firm*—Harold L. Stults

[57] ABSTRACT

An exposure control circuit for a camera is provided with a temperature compensating circuit. The temperature compensating circuit has a compensable range. When the ambient temperature of the camera is beyond the compensable range, the shutter release mechanism is automatically locked to prevent the shutter release.

6 Claims, 1 Drawing Figure

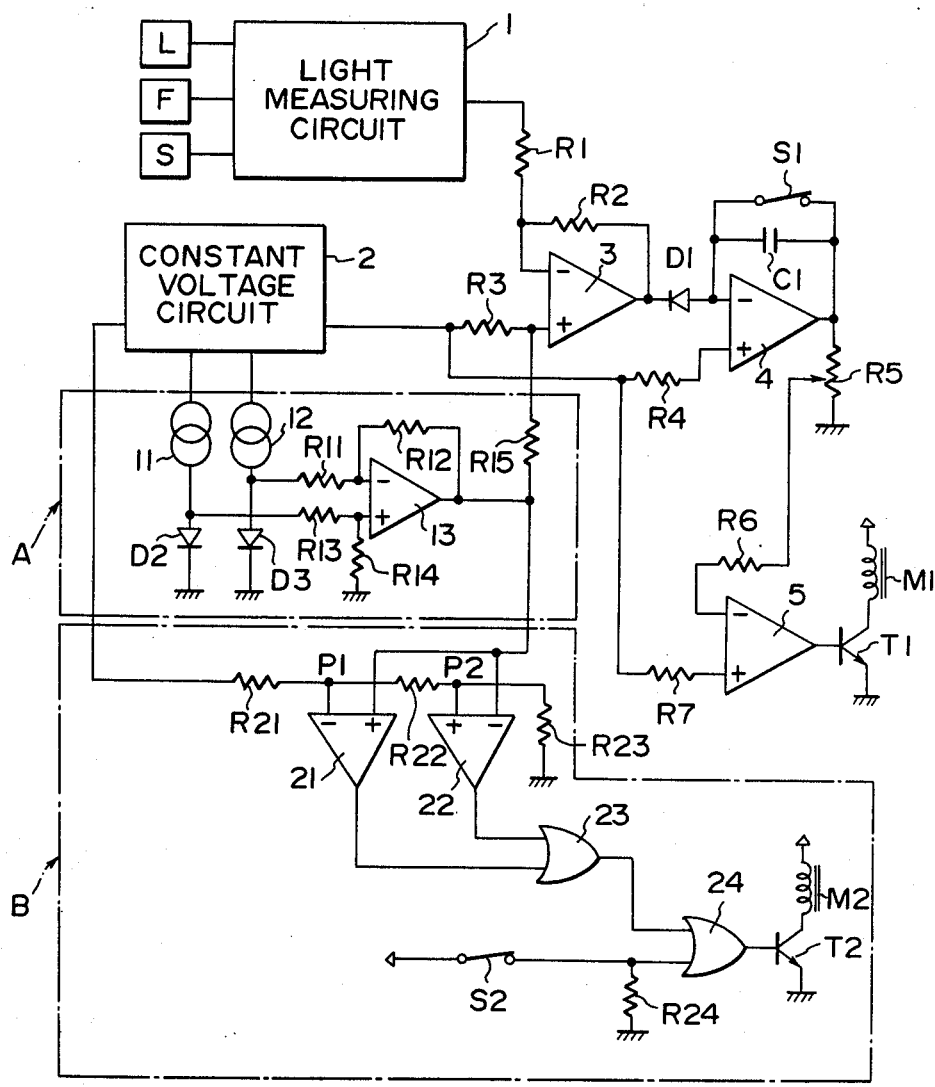

EXPOSURE CONTROL CIRCUIT FOR CAMERAS WITH SHUTTER RELEASE LOCKING MEANS

BACKGROUND OF THE INVENTION

1. Field of the Invention

This invention relates to an exposure control circuit for a camera, and more particularly to an exposure control circuit for a photographic camera in which a shutter release locking means is provided for locking the release of the shutter in the camera when the ambient temperature of the camera becomes beyond the range wherein temperature compensation is possible.

2. Description of the Prior Art

It has been known in the art to lock the shutter in a photographic camera when the voltage of the power source in the exposure control circuit of the camera falls below a predetermined lower limit or when the scene brightness is below a predetermined lower limit. In order to lock the shutter, a locking means is provided in the camera in connection with the exposure control circuit including a power source and a photodetector.

The exposure control circuit becomes inoperable not only in the case that the voltage of the power source falls below a predetermined level, but also in the case that the power source and other electric circuit elements are subjected to an abnormal temperature.

If the automatic exposure control circuit is operated when the ambient temperature is beyond the range in which the circuit is temperature compensated, the exposure is not correctly controlled and accordingly a color failure or a density failure occurs in the color film exposed in the camera. Therefore, it is desired that the shutter be automatically locked when the ambient temperature is beyond the range in which the circuit is capable of being temperature compensated.

SUMMARY OF THE INVENTION

It is, therefore, the primary object of the present invention to provide an exposure control circuit with a shutter locking means which locks the shutter means when the ambient temperature goes beyond the range in which the circuit is capable of being temperature compensated.

It is another object of the present invention to provide an exposure control circuit with a shutter locking means and a temperature compensating means which conducts temperature compensation when the ambient temperature is within a compensable range and locks the shutter to prevent the release thereof when the ambient temperature is beyond the compensable range.

The above objects of the present invention are accomplished by providing in an exposure control circuit a temperature compensating circuit which measures the ambient temperature of the camera and compensates the output of an arithmetic circuit of an exposure control circuit of the camera for the measured ambient temperature, and a shutter release locking circuit which locks the shutter release mechanism when the output of the temperature compensating circuit is beyond a predetermined compensable range.

BRIEF DESCRIPTION OF THE DRAWING

A single FIGURE shows an electric circuit in which the exposure control circuit in accordance with the present invention is applied to an aperture size priority type camera.

DESCRIPTION OF THE PREFERRED EMBODIMENTS

Referring to the drawing, a light measuring circuit 1 is connected at its input terminals with a scene brightness input means L, a film sensitivity input means S and an aperture size input means F. The light measuring circuit 1 gives a log-compressed output which is a function of the exposure time to be effected.

The output of the light measuring circuit 1 is put into the inversion input terminal (−) of an operational amplifier 3 which constitutes an arithmetic circuit by way of a resistor R1. The non-inversion input terminal (+) of the operational amplifier 3 is supplied with a constant voltage from a constant voltage circuit 2 by way of a resistor R3. The output of the operational amplifier 3 is negatively fedback to the inversion input terminal (−) by way of a resistor R2, and is further input into the inversion input terminal of a second operational amplifier 4 by way of a log-expansion diode D1. The second operational amplifier 4 is used for determining exposure and the non-inversion input terminal thereof is supplied with the constant voltage from the constant voltage circuit 2 by way of a resistor R4. The output of the second operational amplifier 4 is negatively fedback by way of a parallel circuit of a capacitor C1 and a break contact switch S1. The output of the second operational amplifier 4 is further input into the inversion input terminal of a third operational amplifier 5 by way of a variable resistor R5 and a resistor R6.

The third operational amplifier 5 constitutes a comparator and is supplied at its non-inversion input terminal with the constant voltage from said constant voltage circuit 2 by way of a resistor R7. The output of the third operational amplifier 5 is put into the base of a transistor T1 and is used to control a trailing shutter blind holding magnet M1.

The above described structure of the circuit is well known in the art and the detailed description of the operation thereof is omitted here.

With the above described well-known part of the circuit for controlling exposure time is connected a temperature compensating circuit A, which is further connected with a shutter release locking circuit B, both of which will be described in detail hereinbelow.

The temperature compensating circuit A is comprised of a pair of constant current circuits 11 and 12 which have different current levels, a pair of diodes D2 and D3 driven by the current of the constant current circuits 11 and 12 respectively, and a subtracting circuit including an operational amplifier 13. The subtracting circuit is comprised of an operational amplifier 13 the inversion input terminal of which is connected with the anode of said diode D3 by way of a resistor R11 and with the output terminal of the operational amplifier 13 by way of a resistor R12, and the non-inversion input terminal of which is connected with said diode D2 by way of a resistor R13 and with an earth terminal by way of a resistor R14. The output of the operational amplifier 13 is put into the non-inversion input terminal (+) of the first operational amplifier 3 by way of a resistor R15 so that the arithmetic circuit constituted of the operational amplifier 3 is compensated for the ambient temperature. The diodes D2 and D3 are located on the camera to be subjected to the ambient temperature. The output of the operational amplifier 13 constituting the subtracting circuit represents the voltage difference between the diodes D2 and D3 which are driven by different level of current supply from the constant current circuits 11 and 12 which is, accordingly, a function of the ambient temperature. The output voltage of the temperature compensating circuit A is thus supplied to the arithmetic circuit constituted of the operational amplifier 13 and also is supplied to the shutter release locking circuit B.

The shutter release locking circuit B is comprised of a pair of operational amplifiers 21 and 22, NOR circuits 23 and 24, a transistor T2, and a shutter release locking magnet M2. The inversion input terminal of the operational amplifier 22 is supplied with the output of said operational amplifier 13, and the non-inversion input of the operational amplifier 22 is connected with the connecting point P2 of two resistors R22 and R23. The non-inversion input terminal of the operational amplifier 21 is supplied with the output of the operational amplifier 13, and the inversion input terminal thereof is connected with the connecting point P1 between two resistors R21 and R22. The voltages at the connecting points P1 and P2 are indicative of the output voltages of the operational amplifier 13 corresponding to the limits of the compensable range of the ambient temperature, respectively.

The output of the two operational amplifiers 21 and 22 are put into the NOR circuit 23, and the output of the NOR circuit 23 and a high level of voltage from a switch S2 which is turned OFF upon the first stage of depression of a shutter release are put into the other NOR circuit 24. The output of the NOR circuit 24 is put into the base of the transistor T2 to control the magnet M2. The magnet M2 releases a shutter release locking means when it is turned OFF, and locks the shutter release when it is turned ON. Said resistors R21, R22 and R23 are connected in series with each other and connected between the constant voltage circuit 2 and the earth.

In operation of the above described exposure control circuit connected with the temperature compensating circuit A and the shutter release locking circuit B, a main switch (not shown) is first turned ON to supply electric power to the circuits and the switch S2 is turned OFF upon the first stage of depression of a shutter release button.

When the ambient temperature of the camera is within the compensable range, the output of the operational amplifier 13 of the temperature compensating circuit A that is a function of the ambient temperature is put into the non-inversion input terminal of the operational amplifier 3 by way of the resistor R15. Therefore, the operational amplifier 3 is supplied with the output of the light measuring circuit 1, the output of the constant voltage circuit 2 and a voltage indicative of the ambient temperature, and is operated to determine the input voltage of the cathode terminal of the diode D1 for log expansion. On the other hand, the voltage at the input terminals of the operational amplifiers 21 and 22 is made to be of a level between the levels at the points P1 and P2, and accordingly the input voltages at the two input terminals of the NOR circuit 23 is of low level. Therefore, since the second NOR circuit 24 is always supplied at the other input terminal with a low level input from the switch S2, when the switch S2 is turned OFF the magnet M2 is turned OFF. Thus, the shutter release is made possible upon the first stage of depression of the shutter release button, and the shutter is released and the leading shutter blind is driven to run and the switch S1 is turned OFF. Upon the turn-OFF of the switch S1, the capacitor C1 is started to be charged by the output corresponding to the scene brightness and the ambient temperature, and the output of the operational amplifier 5 is made to have low level when a determined time has passed since the capacitor began to be charged. Then, the magnet M1 is turned OFF and the trailing shutter blind is driven.

When the ambient temperature of the camera is beyond the compensable range, the voltage at the input terminals of the operational amplifiers 21 and 22 is made to be beyond the level between the levels at the points P1 and P2, and the output of either the operational amplifier 21 or 22 is of high level accordingly. Therefore, the output of the NOR circuit 23 is made to be of high level and the output of the NOR circuit 24 is also made to be of high level regardless of the operation of the switch S2. Consequently, the magnet M2 remains turned ON and the shutter release means is kept locked and shutter release is made impossible.

In the above described embodiment, the exposure control circuit is of the shutter speed determining type (aperture size priority type). However, it will be understood that the present invention can be applied to an exposure control circuit of the aperture size determining type (shutter speed priority type). Further, it will be understood that the output of the temperature compensating circuit A need not be directly put into the input of the operational amplifier 3 but may be put into the constant voltage circuit 2 by way of a digital circuit to change the output of the constant voltage circuit 2 stepwise. Besides, it will further be understood that the turn-OFF operation of the switch S2 need not be related with the first stage of depression of the shutter release button but may be related with the film wind-up operation, for instance.

We claim:

1. An exposure control circuit for a camera with a shutter release locking means comprises a light measuring circuit for measuring the scene brightness, an arithmetic circuit connected with the light measuring circuit, and an exposure determining circuit connected with the arithmetic circuit for determining the exposure of a film in the camera according to the output of the arithmetic circuit, wherein the improvement comprising a temperature compensating circuit which measures the ambient temperature of the camera and compensates the output of said arithmetic circuit for the temperature, said temperature compensating circuit having a compensable range in which the output of the arithmetic circuit can be correctly compensated for the ambient temperature, and a shutter release locking circuit connected with said temperature compensating circuit for locking the shutter release when the ambient temperature is beyond the compensable range.

2. An exposure control circuit for a camera with a shutter release locking means as defined in claim 1 wherein said temperature compensating circuit comprises a pair of diodes located at positions to be subjected to the ambient temperature of the camera and driven by constant currents of predetermined different levels.

3. An exposure control circuit for a camera with a shutter release locking means as defined in claim 1 wherein said shutter release locking circuit comprises a pair of comparators having different detecting levels and connected with the output of said temperature compensating circuit, a NOR circuit connected with said pair of comparators, and an electromagnet connected with the output of the NOR circuit to be driven thereby.

4. An exposure control circuit for a camera with a shutter release locking means as defined in claim 3 wherein said pair of comparators comprises a pair of operational amplifiers, the inversion input terminal of one of the operational amplifiers and the non-inversion input terminal of the other of the operational amplifiers being connected with the output of said temperature compensating circuit, the non-inversion input terminal of said one of the operational amplifiers and the inversion input terminal of said other of the operational amplifiers being connected with connecting points of different level of voltage of a voltage divider consisting of a plurality of dividing resistors connected in series.

5. An exposure control circuit for a camera with a shutter release locking means as defined in claim 4 wherein the outputs of the operational amplifiers are respectively put into the input terminals of said NOR circuit.

6. An exposure control circuit for a camera with a shutter release locking means as defined in claim 5 wherein a second NOR circuit is connected with said NOR circuit at one input thereof and is connected at the other input thereof with a power source by way of a switch which is opened upon depression of a shutter release button, and a transistor is connected at its base with the output of said second NOR circuit and at its collector with said electromagnet.

* * * * *

UNITED STATES PATENT AND TRADEMARK OFFICE
CERTIFICATE OF CORRECTION

PATENT NO. : 4,112,446
DATED : September 5, 1978
INVENTOR(S) : Saburo Numata; Shinichiro Okazaki It is certified that error appears in the above–identified patent and that said Letters Patent are hereby corrected as shown below:

Claim 1, line 2, "comprises" is corrected to read ---comprising---

Claim 1, lines 8 and 9, "comprising" is corrected to read ---comprises---.

Signed and Sealed this

Seventeenth Day of April 1979

[SEAL]

Attest:

RUTH C. MASON
Attesting Officer

DONALD W. BANNER
Commissioner of Patents and Trademarks